United States Patent [19]

Peterson et al.

[11] Patent Number: 4,844,605
[45] Date of Patent: Jul. 4, 1989

[54] AUXILIARY EARPIECE FOR USE WITH EYEGLASSES

[76] Inventors: Kirk E. Peterson, 5151 Crystal Springs Dr. NE., Bainbridge Island, Wash. 98110; Charles B. Fletcher, 15210 SE. 48th Dr., Bellevue, Wash. 98006

[21] Appl. No.: 57,497

[22] Filed: Jun. 3, 1987

[51] Int. Cl.$^4$ ............................................. G02C 5/14
[52] U.S. Cl. ........................................ 351/123; 351/116
[58] Field of Search ............... 351/114, 116, 121, 122, 351/123

[56] References Cited

U.S. PATENT DOCUMENTS

| | | | |
|---|---|---|---|
| 1,636,740 | 7/1927 | Hickey | 351/123 |
| 1,833,792 | 11/1931 | Pfaus et al. | 351/123 |
| 2,229,568 | 1/1941 | Hodgkins | 88/52 |
| 2,626,538 | 1/1953 | Frum | 351/123 |
| 3,476,467 | 11/1969 | Curry | 351/123 |
| 3,957,361 | 5/1976 | Buccicone | 351/123 |
| 4,012,130 | 3/1977 | Guillet | 351/114 |
| 4,548,484 | 10/1985 | Ehring | 351/123 |

FOREIGN PATENT DOCUMENTS 2280097  2/1976  France .............................. 351/123

Primary Examiner—Rodney B. Bovernick
Assistant Examiner—Jay P. Ryan
Attorney, Agent, or Firm—Christensen, O'Connor, Johnson & Kindness

[57] ABSTRACT

An auxiliary earpiece is disclosed that is positively, adjustably, and removably attachable to an eyeglass bow with the aid of an insert. The earpiece includes an ear-engaging portion and a bow-receiving portion through which the bow is passed. The insert includes a wedge-like section that is positioned within the bow-receiving portion of the earpiece adjacent one side of the bow. By appropriately positioning the insert with respect to the bow-receiving portion of the earpiece, an interference fit is produced between the bow, the insert, and the earpiece to provide the desired attachment. The resultant side-to-side clamping works well with a wide variety of eyeglass frames making the earpiece relatively interchangeable among eyeglasses.

7 Claims, 2 Drawing Sheets

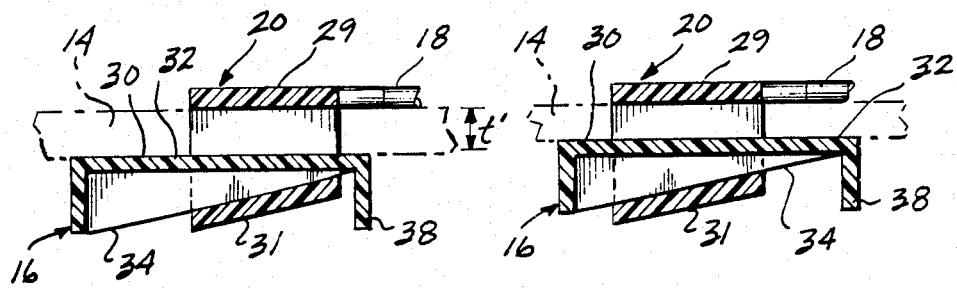
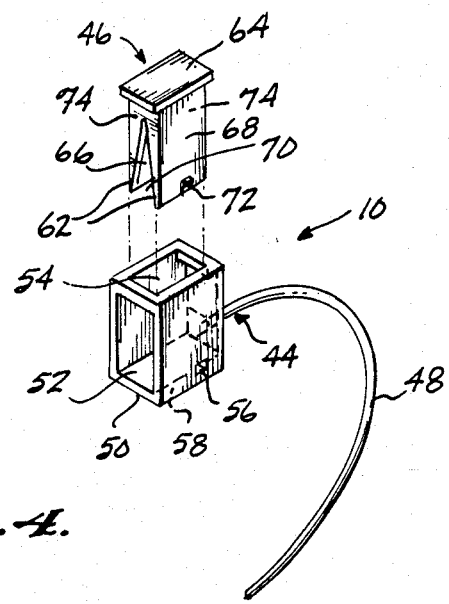
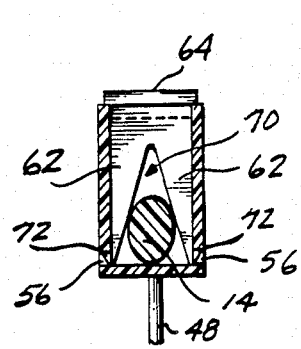 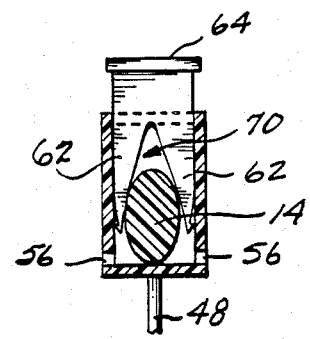

AUXILIARY EARPIECE FOR USE WITH EYEGLASSES

FIELD OF THE INVENTION

This invention relates to eyeglasses and, more particularly, to an auxiliary earpiece for use with eyeglasses.

BACKGROUND OF THE INVENTION

A standard eyeglass frame includes a pair of rims, connected by a bridge, and two bows that project rearwardly from the sides of the rims. Each bow typically includes a relatively straight temple section and another relatively straight earpiece section that depends downwardly from the temple section at an obtuse angle. The earpiece section cooperates with a wearer's ear to help maintain the position of the eyeglasses on the wearer's head. While a relatively straight earpiece section increases wearer comfort by providing minimal contact with the wearer's ear, its ability to keep the eyeglasses in place is limited. For example, when eyewear constructed in this manner is worn during participation in contact sports it may be knocked from the wearer's head to the ground, increasing significantly the likelihood of damage to the lenses or frame. Similarly, sunglasses worn for boating or skiing are frequently lost due to the inadequate holding power of such an arrangement.

To increase a bow's ability to retain eyeglasses upon a wearer's head, curved earpiece sections that engage an increased portion of the wearer's ear have been employed. As will be appreciated, however, the substitution of a curved earpiece section for the traditional relatively straight earpiece section decreases wearer comfort. Further, the bows of each pair of eyeglasses to be protected must be constructed in this manner.

In an effort to provide eyeglass frames that alternatively offer comfort and security, traditionally constructed bows have been equipped with retractable earpiece sections for engaging a greater portion of the wearer's ear when deployed. While such retractable earpiece sections do provide some accommodation between comfort and security, bows constructed in this manner are still required for each pair of eyeglasses to be protected.

Another approach taken to increase the security of eyewear upon a wearer's head has been the use of bow attachments that offer additional contact with the ear. While such devices do increase eyeglass security, they suffer from several disadvantages. First, prior art attachments apparently do not offer a positive connection between the attachment and the bow. Thus, the connection may slip in precisely those instances where protection is most required. Second, prior art attachments are apparently designed for use with bows having only particular, predetermined cross sections. As a result, if an individual has several pairs of eyeglasses to be protected, different attachments may be required.

In light of the foregoing remarks, it would be desirable to produce an auxiliary earpiece that can be attached to an eyeglass bow when greater retention of the eyeglasses on a wearer's head is required and removed from the eyeglass bow when wearer comfort is of paramount concern. In addition, it would be advantageous for the auxiliary earpiece to be usable with bows of various cross section. Finally, it would be desirable for the earpiece to be positively securable to bows of such different construction.

SUMMARY OF THE INVENTION

In accordance with this invention, an eyeglass accessory is provided that is adjustably and removably attachable to an eyeglass bow to cooperatively engage the ear of an eyeglass wearer when attached to the bow. The accessory includes an earpiece, for cooperatively engaging the ear of the eyeglass wearer, and an attachment device, for allowing the earpiece to be positively attached to and removed from the bow. Preferably, the attachment device produces an interference fit between the earpiece and the sides of the eyeglass bow.

In accordance with a particular aspect of this invention, the earpiece includes a curved-engaging portion and a bow-receiving portion located at one end of the ear-engaging portion. The bow-receiving portion of the earpiece has a passage extending therethrough to receive eyeglass bows of various construction. The attachment device is an insert having a thickness that varies from one end of the element to the other and which is insertable into the passage extending through the bow-receiving portion of the earpiece to produce the interference fit between the earpiece and the sides of the eyeglass bow. The varying thickness of the insert allows the interference fit to be produced for bows of different thickness.

BRIEF DESCRIPTION OF THE DRAWINGS

The invention will presently be described in greater detail, by way of example, with reference to the accompanying drawings, wherein:

FIGS. 3A and 3B are cross-sectional views of the earpiece and insert illustrated in FIG. 1, showing how the insert is adjusted for use with frames of varying thickness;

FIG. 4 is an exploded pictorial view of an alternative embodiment of the earpiece and insert depicted in FIG. 1; and FIGS. 5A and 5B are cross-sectional views of the earpiece and insert depicted in FIG. 4, when assembled, showing adjustment of the insert for frames having bows of different thickness.

DETAILED DESCRIPTION OF THE INVENTION

Figure 1:
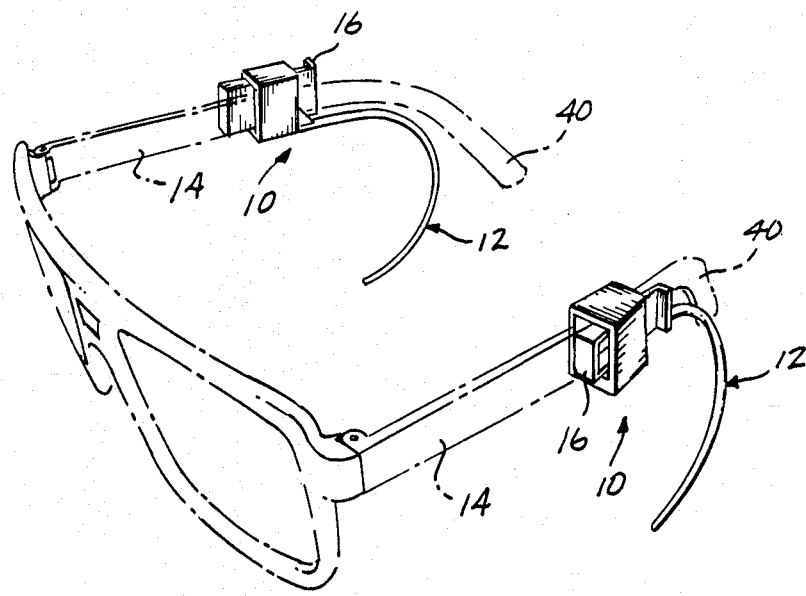
FIG. 1 is a pictoral view of an earpiece secured to an eyeglass bow with an insert, in accordance with this invention.

Referring now to FIG. 1, an eyeglass accessory 10 constructed in accordance with this invention is illustrated. As shown, accessory 10 includes an earpiece 12 that is attached to a bow 14 of a pair of eyeglasses with the aid of an insert 16. As will be discussed in greater detail below, insert 16 allows earpiece 12 to be positively, adjustably, and removably attached to bow 14. With the earpiece 12 secured to each bow 14 of the eyeglasses, the eyeglasses can be worn with confidence that they will remain on the wearer's head during substantially any activity. When security becomes less important than comfort, each earpiece 12 can be removed from its bow 14 by simply repositioning insert 16 and withdrawing the bow 14. The earpieces 12 can then be used to protect a different pair of glasses by reattaching them to the bows of the other eyeglasses in the manner described below.

Figure 2:
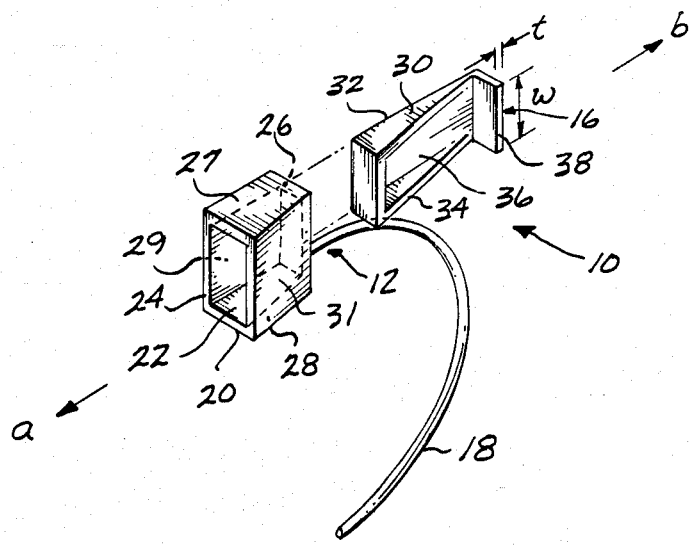
FIG. 2 is an exploded pictorial view of the earpiece and insert illustrated in FIG. 1.

Addressing now the elements of eyeglass accessory 10 in greater detail, reference is had to FIG. 2. As shown, earpiece 12 includes an ear-engaging portion 18 and a bow-receiving portion 20. The ear-engaging portion 18 is preferably substantially semicircular in shape and is dimensioned to approximate the curvature of the back of a wearer's ear. The ear-engaging portion 18 may be circular in cross section or slightly elliptic, with the major diameter of the ellipsis provided in the plane of symmetry of ear-engaging portion 18 to increase the surface area of the ear-engaging portion 18 against a wearer's head. The cross section of the ear-engaging portion 18 preferably remains constant throughout its length. Ear-engaging portion 18 is preferably molded from a thermoplastic material of an appropriately selected color.

As shown in FIG. 2, the bow-receiving portion 20 of earpiece 12 is substantially a polyhedron molded simultaneously with bow-receiving portion 20 from the same material. The polyhedron is defined by trapezoidal upper and lower surfaces 27 and 28, a rectangular forward surface 24, a smaller rectangular rear surface 26, and rectangular side surfaces 29 and 31. Upper and lower surfaces 27 and 28 are parallel to each other, as are forward and rear surfaces 24 and 26. While side surface 29 is normal to surfaces 24, 26, 27, and 28, side surface 31 forms an acute angle of approximately 10-15 degrees with surface 24 and, hence, an obtuse angle with surface 26. A passage 22 extends between the forward surface 24 and rear surface 26 of the bow-receiving portion 20. Passage 22 has a rectangular cross section whose area decreases as a function of distance from forward surface 24. As will be appreciated, passage 22 is dimensioned to receive eyeglass bows of various dimension and construction. For wearer comfort, all edges and corners of the bow-receiving portion 20 are rounded.

The ear-engaging portion 18 of eyepiece 12 joins bow-receiving portion 20 at the corner defined by the lower surface 28 and side surface 29 of the bow-receiving portion 20, with a gradual transition being provided to reduce the possibility of a stress failure at the joint. The lower surface 28 of bow-receiving portion 20 is approximately tangential to the ear-engaging portion 18 at the point of connection.

Turning now to the insert 16, as shown in FIG. 2, it includes a wedge-like section 30 having a bow-engaging surface 32 and an earpiece-engaging surface 34. Surfaces 32 and 34 are separated by a distance that varies from a maximum at one end of section 30, for example, 0.2 inches (0.5 cm), to a minimum at the other end of section 30, for example, 0.05 inches (0.13 cm). The maximum thickness of wedge-like section 30 is selected to be slightly greater than the minimum width of passage 22. The minimum thickness of wedge-like section 30, on the other hand, is slightly less than that required to produce an interference fit in passage 22 when the thickest bow 14 expected to be used is employed. The angle between surfaces 32 and 34 corresponds to the slope of the side 31 of the bow-receiving portion 20 of earpiece 12 measured with respect to the other side 29. As will be appreciated, the length of wedge-like section 30 is selected to allow insert 16 to be laterally displaced with respect to the bow-receiving portion 20 of earpiece 12 through a range of adjustments, while maintaining some portion of wedge-like section 30 within passage 22. In this manner, the thickness of the section 30 in passage 22 can be varied to produce the desired interference fit for bows 14 of various thickness. For molding convenience, a recess 36 is provided in the earpiece-engaging surface 34 of insert 16, to remove material that might otherwise undesirably affect the dimensions of insert 16 upon cooling.

At the "thin" end of insert 16, a retainer projection 38 extends perpendicularly from the bow-engaging surface 32 of wedge-like section 30 in the direction of the earpiece-engaging surface 32. Projection 38 is of sufficient length to captivate insert 16 within passage 22 and its length preferably corresponds to the maximum thickness of section 30. The thickness t of projection 38 is equal to the minimum thickness of wedge-like section 30 and its width w corresponds to that of the wedge-like section 30. Insert 16 is preferably molded of the same thermoplastic material as earpiece 12.

The use of an eyeglass accessory 10, constructed as shown in FIGS. 1 and 2, is as follows. Insert 16 is prepositioned longitudinally within the passage 22 of the bow-receiving portion 20 of earpiece 12. When appropriately inserted, the projection 38, in cooperation with the thickest end of insert 16, captivates insert 16 within passage 22, reducing the likelihood that insert 16 will become lost. The end 40 of bow 14 is then inserted through passage 22, adjacent the bow-engaging surface 32 of insert 16 and in the direction of the ear-engaging portion 18 of earpiece 12.

By moving insert 16 in the direction designated "a" in FIG. 2, the distance between the bow-engaging surface 32 of insert 16 and the sidewall 29 of the bow-receiving portion 20 of earpiece 12 is increased to a maximum of, for example, 0.15 inches (0.38 cm), allowing bow 14 to more easily be inserted. Then, with the earpiece 12 appropriately positioned with respect to bow 14, insert 16 is moved in the direction designated "b" until a portion of the wedge-like section 30 of insert 16 that is sufficiently thick to produce an interference fit between the bow 14 and bow-receiving portion 20 of earpiece 12 is introduced into passage 22. In this manner, earpiece 12 is positively secured to bow 14. To remove earpiece 12 from bow 14, insert 16 is then returned in the direction designated "a" in FIG. 2. As a result, the thicker portion of wedge-like section 30 is forced out of passage 22, eliminating the interference fit and allowing bow 14 to be withdrawn.

To illustrate the manner in which earpiece 12 and insert 16 are used to adjustably accommodate bows 14 of varying thickness, reference is had to FIGS. 3A and 3B. As shown in the horizontal section of FIG. 3A, earpiece 12 is secured to a relatively thick bow 14. In this situation, a relatively thin portion of the wedge-like section 30 of insert 16 is frictionally secured between bow 14 and the sidewall 42 of earpiece 12. When a thinner bow 14 is involved, as shown in the horizontal section of FIG. 3B, the position of insert 16 is shifted with a thicker portion of wedge-like section 30 being located within passage 22 to provide the requisite interference fit.

Given the corresponding slope of the earpiece-engaging surface 34 of insert 16 and the side 31 of the bow-receiving portion 20 of earpiece 12, the portion of passage 22 available to receive bow 14 for any selected insert adjustment is of constant width the length of the passage. As will be appreciated from FIGS. 3A and 3B, this ensures that the insert 16 will be in contact with bow 14 throughout the insert's length, distributing force evenly to bow 14 and holding it securely in place.

The use of an interference fit between insert 16, the sides of bow 14, and the bow-receiving portion 20 of earpiece 12 as described above is preferred for the following reason. Although not addressed by the prior art, an examination of eyeglass bows of various construction has revealed that the thickness, designated t' in FIG. 3A, of a given bow 14 typically remains relatively constant throughout its length. Thus, a substantial portion of the bow-engaging surface 32 of an insert 16, constructed as outlined above, is placed in contact with bow 14. As a result, the frictional force of insert 16 against bow 14 is distributed relatively evenly, ensuring a secure attachment of earpiece 12 to bow 14. This is true whether the relatively thin frame of FIG. 1 or the thicker frame of FIG. 2 is employed.

In contrast to the thickness of bow 14, it has been discovered that a bow's height, designated h, may vary significantly along its length. As a result, if the bow 14 were positioned within passage 22 at the point shown in FIG. 2, a clamping arrangement that applied an interference fit between the upper and lower surfaces of the bow 14, and the bow-receiving portion 20 of earpiece 12, would result in the application of frictional force to a rather limited portion of bow 14. For that reason, the configuration described previously is preferred.

Addressing now an alternative embodiment of eyeglass accessory 10, reference is had to FIG. 4. As shown, in this alternative embodiment, accessory 10 includes an earpiece 44 and insert 46 that allows earpiece 44 to be attached to bow 14. The earpiece 44 includes an ear-engaging portion 48, constructed in the manner previously described in connection with ear-engaging portion 18. Earpiece 44 also includes a bow-receiving portion 50 that is constructed similar to the bow-receiving portion 20 described above in connection with FIG. 1. In addition to a passage 52 corresponding to the previously described passage 22, bow-receiving portion 50 includes an insert passage 54 that projects downward through the upper surface 54 of bow-receiving portion 50. Passage 54 is substantially rectangular in cross section and has a first dimension that corresponds with the width of passage 52 and a second dimension that is slightly less than the length of passage 52. More particularly, as shown in FIG. 4, insert passage 54 is dimensioned to receive insert 46. A small opening 56 is provided adjacent the lower surface 58 on each side of bow-receiving portion 50.

Insert 46 is a roughly U-shaped element that includes a pair of arms 62 connected by a top section 64. The thickness of arms 62, measured between their inner and outer surfaces 66 and 68, decreases with distance from top section 64. The inner surfaces 66 of arms 62 define a bow-engaging recess 70. A slight rib or projection 72 is provided on the outer surface 68 of each arm at a point distal with respect to the top section 64 and midway between the ends 74 of insert 46.

As will be appreciated, the function of earpiece 44 and insert 46 is substantially the same as that of the earpiece 12 and insert 16 described in connection with FIG. 1. More particularly, the end 40 of bow 14 is inserted through the longitudinal passage 52 provided in the bow-receiving portion 50 of earpiece 44. When the desired relationship between earpiece 44 and bow 14 is reached, insert 46 is pushed downward through passage 54 until the bow 14 is engaged by the recess 70 defined by arms 62. As will be appreciated, the nonuniform thickness of arms 62 allows bows 14 of varying width to be securely positioned between arms 62.

More particularly, as shown in the vertical section of FIG. 5A, a bow 14 having a relatively small cross section is securely engaged between the arms 62 of insert 46, when insert 46 is fully introduced into passage 54. In this situation, the nib 72 at the end of each arm 62 projects through the corresponding opening 58 in bow-receiving portion 50, preventing insert 46 from exiting passage 54 until the nibs 72 are manually depressed inwardly. As shown in the vertical section of FIG. 5B, when a bow 14 having a thicker cross section is employed, the insert 46 is simply introduced a lesser distance into passage 54 before an interference fit is produced between the sides of bow 14 and the bow-receiving portion 50 of earpiece 46.

As will be appreciated, the arrangement depicted in FIG. 4 allows earpiece 44 to be positively, adjustably, and removably attached to bows of various construction. In this manner, an earpiece 44 can be attached to each bow 14 of the eyeglasses when the eyeglasses are to be securely held on a wearer's head. When comfort is of greater importance, the earpieces 44 are simply removed.

Those skilled in the art will recognize that the embodiments of the invention disclosed herein are exemplary in nature and that various changes can be made therein without departing from the scope and the spirit of the invention. In this regard, and as was previously mentioned, the invention is readily embodied with an insert employing one or two wedge-like sections. Further, it will be recognized that the shape and style of the ear-engaging portion and bow-receiving portion of the earpiece can be varied. Because of the above and numerous other variations and modifications that will occur to those skilled in the art, the following claims should not be limited to the embodiments illustrated and discussed herein.

The embodiments of the invention in which an exclusive property or privilege is claimed are defined as follows:

1. An eyeglass accessory that is adjustably and removably attachable to an eyeglass bow to cooperatively engage the ear of an eyeglass wearer when attached to the bow, the accessory comprising:
   an earpiece including an ear-engaging portion and a bow-receiving portion located at one end of said ear-engaging portion, said bow-receiving portion having a passage extending therethrough dimensioned to receive eyeglass bows of various construction; and,
   an insert having a bow-contacting surface and an earpiece-contacting surface, the thickness of said insert measured between said bow-contacting surface and said earpiece-contacting surface varying along said insert, said insert being insertable into said passage extending through said bow-receiving portion of said earpiece to produce an interference fit between said earpiece and the sides of the eyeglass bow, the varying thickness of said insert allowing the interference fit to be produced for bows of various construction.

2. The eyeglass accessory of claim 1, further comprising coupling means for coupling said insert to said earpiece to reduce the likelihood of said insert becoming lost when said accessory is removed from the eyeglass bow.

3. The eyeglass accessory of claim 2, wherein said coupling means captivates a portion of said insert within said passage extending through said bow-receiving portion of said earpiece.

4. The eyeglass accessory of claim 3, wherein said coupling means comprises a projection at one end of said insert, said projection limiting the ability of said insert to be removed from said passage extending through said bow-receiving portion of said earpiece upon insertion.

5. The eyeglass accessory of claim 1, wherein said insert and said passage are cooperatively dimensioned to maintain substantially the entire length of said bow-contacting surface of said insert in contact with an eyeglass bow when a bow is inserted in said passage.

6. The eyeglass accessory of claim 5, wherein said bow-receiving portion of said earpiece further has an opening extending at least partially therethrough in a direction normal to said passage and wherein said insert for producing an interference fit between said earpiece and the sides of the eyeglass bow comprises a U-shaped element having two wedge-like arms of varying thickness, said U-shaped element being insertable into said opening in said bow-receiving portion of said earpiece to receive the eyeglass bow between said wedge-like arms and produce the interference fit between said earpiece and the sides of the bow, the varying thickness of said wedge-like arms allowing the interference fit to be produced for bows of different thickness.

7. The eyeglass accessory of claim 6, further comprising coupling means for coupling said U-shaped element to said earpiece to reduce the likelihood of said U-shaped element becoming lost when said accessory is removed from the eyeglass bow.

* * * * *